VALVE WITH NON-CHATTERING SOLENOID PILOT VALVE CONTROL
Filed Jan. 21, 1953 2 Sheets-Sheet 1
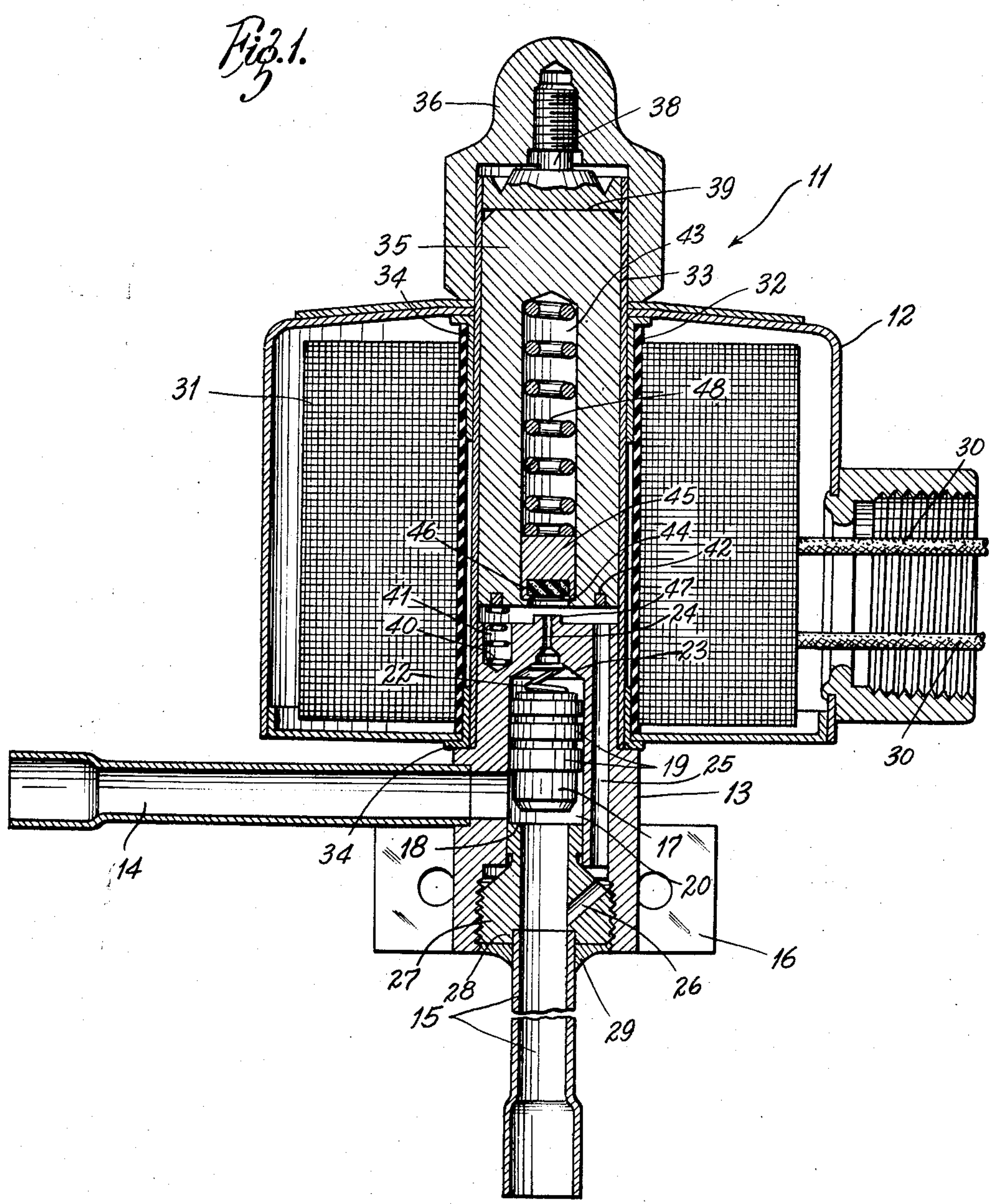
INVENTOR:
LYLE S. HOUGHTON,
BY Kingsland, Rogers & Ezell
ATTORNEYS Feb. 26, 1957 L. S. HOUGHTON 2,783,019
VALVE WITH NON-CHATTERING SOLENOID PILOT VALVE CONTROL
Filed Jan. 21, 1953 2 Sheets-Sheet 2
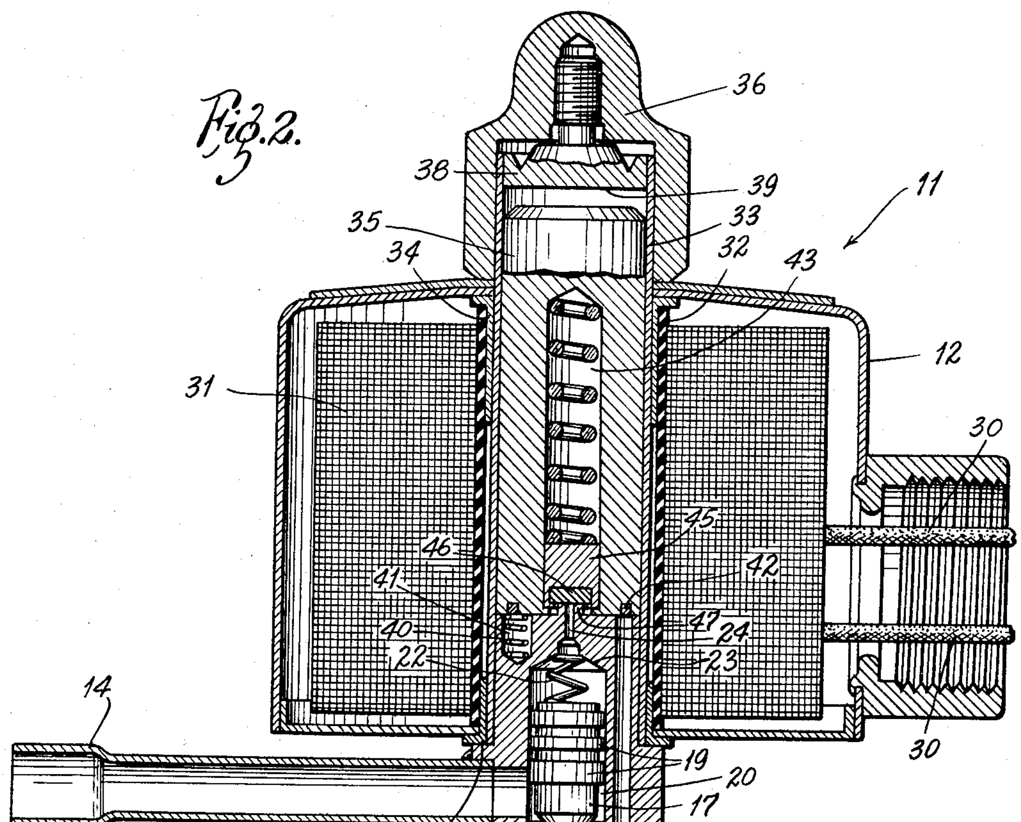
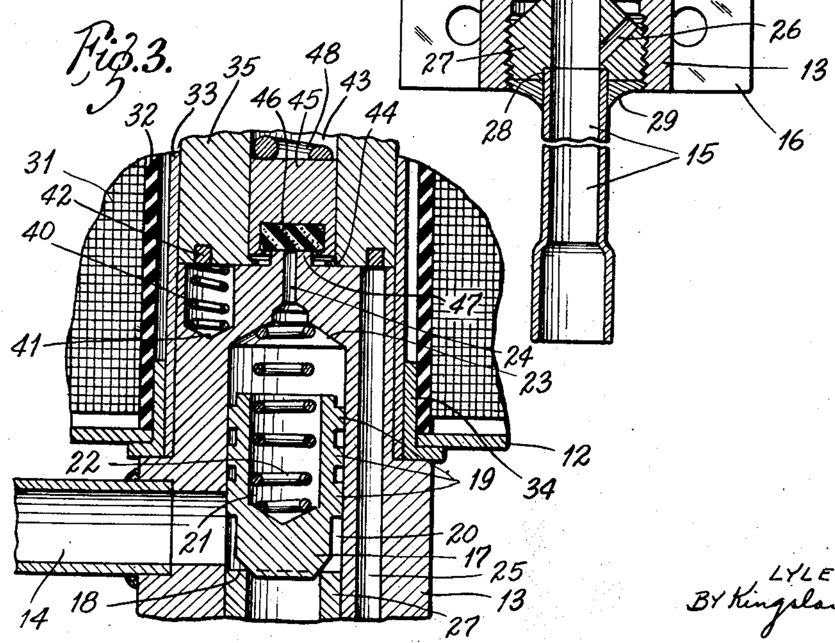
INVENTOR:
LYLE S. HOUGHTON,
BY Kingsland, Rogers & Ezell
ATTORNEYS

United States Patent Office 2,783,019
Patented Feb. 26, 1957

2,783,019

VALVE WITH NON-CHATTERING SOLENOID PILOT VALVE CONTROL

Lyle S. Houghton, Brentwood, Mo., assignor to Alco Valve Company, University City, Mo., a corporation of Missouri Application January 21, 1953, Serial No. 332,281

3 Claims. (Cl. 251—30)

This invention relates to improvements in solenoid valves and, in particular, in concerned with a pilot operated normally open solenoid valve having a spring actuated closing member which is adapted to be completely and positively operated prior to complete actuation of the solenoid member itself.

In the past, pilot operated solenoid valves have conventionally used closing mechanisms such that the valve closure and the complete operation of the armature in the solenoid is effected at the same time, which has led to objectionable chattering caused by the sudden stop of the armature against stoppage means. This has contributed to faulty operation of the valve due to partial leakage through the valve caused by such spasmodic chattering before the valve is stabilized in the closed position.

Accordingly, it is an object of this invention to provide a solenoid valve in which the valve closure may be effected without any chattering upon actuation of the solenoid.

It is still a further object of this invention to provide a solenoid valve having a pilot operation in which the closure of the pilot valve is effected upon operation of the solenoid member without the transmission of any chattering force to the closing member by the armature of the solenoid.

Yet another object of this invention is to provide a pilot operated solenoid valve having a closing member which is adapted to be operated by the actuation of the armature at the solenoid, with provision of a dampening device associated with the closing member and the armature such that any chattering force of the armature will not be transmitted to the closing member.

It is still another object of this invention to provide a pilot operated solenoid valve having a closing member provided in the armature, together with a dampening device, which can be made out of simple standard parts without the necessity of any special fabrication, so as to provide a rugged and efficiently operating solenoid valve at a minimum of labor and cost.

In the accompanying drawing, illustration is made of the preferred embodiment of this invention, but it is to be realized that the invention is not limited to the apparatus therein disclosed and that modifications may be made thereof that will readily appear to those skilled in the art.

In the drawings:

Fig. 1 is a cross-sectional view of the solenoid valve in normally open position and showing the armature in the unoperated position;

Fig. 2 is a cross-sectional view of the solenoid valve in a closed position, similar to Fig. 1, but showing the armature operated so as to cut off flow of fluid through the valve; and Fig. 3 is an enlarged fragmentary cross-sectional view of a portion of Fig. 2 showing the pilot valve mechanism and the bottom of the armature and closing members.

Referring now to the drawings, the solenoid valve is generally shown in the normally open position in Fig. 1 at 11 and includes a solenoid casing 12, valve housing 13, fluid inlet 14, and a fluid outlet 15. The solenoid valve 11 is adapted to be mounted to a wall or other support by an associated bracket 16 having appropriate holes for insertion of bolts or screws and the like, therein.

The valve housing 13 includes a main valve 17 which is adapted to engage a valve seat 18 so as to cut off fluid flow between inlet 14 and outlet 15. The main valve 17 further includes a series of spaced, annular flanges 19 which are adapted to fit within the bore 20 of the valve housing. These annular flanges are in the nature of integral washers, as shown in Fig. 3, and provide a relatively close fit in the bore 20, which, however, allows a desired degree of leakage therethrough. Nested within a recess 21 of the main valve, as shown in Fig. 3, is a spring 22 which bears against the end seat 23 of the bore 23.

An axial passage 24 is provided in the top of the valve body 13 so as to communicate with the bore 20 and a pilot valve seat 47 and allow passage of fluid therethrough. A bypass passage 25 is provided at one side interiorly of the valve 13 parallel to the axis of the bore 20 for pick-up fluid through the passage 24 and pilot valve seat 47 when the solenoid valve (to be described) is opened. The bottom of the passage 25 communicates with a side passage 26 which is drilled through seat member 27 which is threadably received by valve housing 13 and provided with a central opening and valve seat 18 at the top. The valve seat member 27 has an inner recess 28 so as to receive the protruding end of the conduit 15 and this whole assembly is joined together by a solder seal 29 to prevent leakage.

The solenoid itself includes the casing 12 and electrical leads 30, within a conduit, and which lead to an energizing coil 31. Situated interiorly of the coil 31 is a non-magnetic tube 32 on which coil 31 is wound. Another non-magnetic tube 33 is disposed inside tube 32 and is closed at the top by an adjustable plug member 38 and the whole assembly is attached to the top of valve housing 13 to provide a pressure tight enclosure in which armature 35 and other valve parts are contained. The two tubes 32 and 33 are separated by upper and lower magnetic sleeves 34 which serve to properly distribute the flux through the armature 35 loosely disposed within innermost tube 33 so as to be capable of axial movement, depending upon the energization of the coil 31. A threaded nut 36 is disposed on top of tube 33 and serves to hold casing 12, coil 31 and sleeves 34 to valve 13. A threaded plug member 38 is provided inside nut 36 and is adjustable therein so as to form a limiting means through lower face 39 for the upward travel of armature 35.

The armature 35 tends to be held in the inoperative position, as shown in Fig. 1 by means of a light, helical spring 40 which is disposed within spring retaining opening 41 at the top of the valve housing 13. A washer-like shading band 42 is set within the bottom of the armature to provide a short circuiting arrangement for a portion of the magnetic flux when the solenoid is energized and acts to eliminate noise when alternating current is applied to coil 31 when the armature is operated to the position shown in Fig. 2. The armature is further provided with a central bore 43 extending through a major portion of its length, and at the bottom of this bore there is a staked-over portion 44 so as to form an internal restriction within. Disposed within the bore is a pilot valve member 45 which is provided with a pilot seat disc 46 adapted to bear against the valve seat 47 enclosing the pilot passage 24. The valve 45 is normally held against the restriction 44 by means of a comparatively strong helical spring 48 which is disposed within the bore 43 of the armature.

*Operation*

The operation of the apparatus when the solenoid coil is not energized is shown in Fig. 1, where it is readily seen that the armature 35 is pushed against plug 38 by the force of the helical spring 40. In this position, the pilot valve body 45 is retained against the restriction 44 by the force of the helical spring 48 within the armature, and any fluid passing through passage 24 is free to flow through passage 25 and out through conduit 15. In this position, fluid under pressure in conduit 14 will leak past the main valve 17, past the flanges 19, into bore 20 and out through passage 24. It is readily apparent that there is a lower pressure within the bore 20 at the back of the valve 17 by means of the exhaust through the pilot passages 24, 25, 26 and out through low pressure conduit 15, such that the higher pressure at the bottom of the main valve 17 will cause the valve to move upwardly against the force of the light helical spring 22 and thereby lift the valve 17 from the valve seat 18. Thus, in the normal operation of this apparatus, when the coil is not energized the valve 17 will be opened so as to provide for free and uninterrupted flow of fluid from the high pressure conduit 14 through valve seat 18 and out the conduit 15.

The closing operation of the valve 17 is effected by energization of the coil 31, whereupon the armature 35 will immediately be caused to move downwardly as shown in Fig. 2, so that it abuts against the top of the valve body 13. When this is effected, the pilot valve 45 and the pilot seat disc 46 will be forced by the helical spring 48, which is designed to have a greater force than the spring 41, to bear against the valve seat 47 at the top of the passage 24. Due to the force of the helical spring 48, the pilot seat disc 46 will be securely held in engagement with the valve seat 47 even though the armature is subjected to a slight chatter against the top of the valve member 13. As seen in Fig. 2, the internal restriction 44 is separated from the bottom of the valve body 45 a slight distance to provide for an override, so that the armature may move up and down a slight distance against the top of the valve body 13 without affecting the pilot valve body 45. Therefore, when the armature is brought into contact with the valve member 13 upon the initial operation, and chatters or bounces upon contact and before stabilization sets in, there will be no effect upon the closure of the pilot seat disc 46 against the seat 47, since it will be held throughout such operation in firm contact by the force of the helical spring within the armature.

Upon the closure of the valve 45 and the pilot seat disc 46 against the seat 47, the pressure at the top of the bore 20 due to leakage past the flanges 19 will build up so as to be equalized with the inlet pressure in the conduit 14. When this is effected, the helical spring 22 will no longer be compressed by the pressure differential and will act to close the valve 17 against the valve seat 18 and thereby cut off fluid flow between the inlet conduit 14 and the outlet conduit 15.

It is apparent from the above description that there has been provided by this invention a unique and novel means for closing a valve member with an override provision such that the actuating element itself may be subjected to chattering or a resonating effect without altering the efficient closure of the valve member. Obvious modifications of this invention may be made, as will appear to those skilled in the art, and it is desired that the invention be limited only by the scope of the appended claims.

What is claimed is:

1. A solenoid valve having an energizing coil and an armature capable of being energized, a valve seat contacting element and a valve seat to control fluid flow therethrough, first and second stop means within said valve so as to limit the movement of said armature upon energization and deenergization of said coil, respectively, the first of said stop means being associated with said valve seat and offset therefrom, means within said armature to prevent transmission of chattering movement from said armature to said element as it is brought against said last named stop means and effect thereby a firm closing of said element against said valve seat, said means for preventing chattering of the valve including the valve seat contacting element supported by said armature and being adapted for relative movement therewith, said valve seat contacting element being limited by a third stop means within said armature to a distance from the end of the armature which is less than the offset distance between the first stop means and the valve seat, and means for continuously urging said element against said valve seat, independent of chattering of the armature against the first stop means.

2. A pilot operated solenoid valve assembly having a main valve and a valve seat positioned between a main fluid inlet and outlet, biasing means for urging the main valve against the valve seat to close communication between the inlet and outlet, pilot flow means having communication from said main inlet past an end of the main valve opposite to the valve seat and through a restricted pilot opening to said main outlet, a solenoid operated pilot valve for controlling said pilot flow means through the restricted opening and thereby said main valve, said pilot valve when opened establishing a pressure differential at the valve seat end of the main valve greater than the force of said biasing means so as to hold the main valve in an open position, said pilot valve having a pilot valve seat and a pilot valve member engageable therewith, said pilot valve member being operable into and out of contact with said pilot valve seat for fluid control, means within said pilot valve to keep said member in contact with the pilot valve seat and prevent chattering when said pilot valve member is brought rapidly into contact with said pilot valve seat, said pilot valve comprising an armature capable of being energized so as to move the pilot valve member with respect to the pilot valve seat to control fluid flow therethrough, a plurality of stop means to limit the movement of said armature upon energization and deenergization of said solenoid, one of said stop means being associated with said pilot valve seat, and means within said armature providing lost motion between the pilot valve member and said armature to prevent transmission of chattering movement from said armature to said pilot valve member as it is brought against said last named stop means and effect thereby a firm closing of said member against said pilot valve seat.

3. A pilot operated solenoid valve assembly having a main valve and a valve seat positioned between a main fluid inlet and outlet, biasing means for urging the main valve against the valve seat to close communication between the inlet and outlet, pilot flow means having communication from said main inlet past an end of the main valve opposite to the valve seat and through a restricted pilot opening to said main outlet, a solenoid operated pilot valve for controlling said pilot flow means through the restricted opening and thereby said main valve, said pilot valve when opened establishing a pressure differential at the valve seat end of the main valve greater than the force of said biasing means so as to hold the main valve in an open position, said pilot valve having a pilot valve seat and a pilot valve member engageable therewith, said pilot valve member being operable into and out of contact with said pilot valve seat for fluid control, means within said pilot valve to keep said member in contact with the pilot valve seat and prevent chattering when said pilot valve member is brought rapidly into contact with said pilot valve seat, said means for preventing chattering of the pilot valve including the pilot valve member supported within an armature in said solenoid and being adapted for relative movement therewith, stop means associated with the pilot valve seat for limiting movement of said armature upon energization of said solenoid member being provided with a biasing means so as to be continuously urged toward said pilot valve seat for holding contact therewith despite spasmodic chattering of the armature against said stop means associated with said pilot valve seat upon closing.

References Cited in the file of this patent

UNITED STATES PATENTS

| | | |
|---|---|---|
| 926,389 | Collin | June 29, 1909 |
| 1,885,846 | Littlefield | Nov. 1, 1932 |
| 2,204,808 | McNeal | June 18, 1940 |
| 2,212,486 | Zoder | Aug. 20, 1940 |
| 2,398,775 | Beekley et al. | Apr. 23, 1946 |
| 2,575,272 | Harris | Nov. 13, 1951 |
| 2,619,121 | Renick | Nov. 25, 1952 |
| 2,622,618 | Ghormley | Dec. 23, 1952 |
| 2,654,393 | Ghormley | Oct. 6, 1953 |

FOREIGN PATENTS

| | | |
|---|---|---|
| 1,012,005 | France | Apr. 9, 1952 |